Patented July 17, 1951

2,560,588

UNITED STATES PATENT OFFICE 2,560,588

MINERAL OIL CONTAINING POLYMERS OF ESTERS OF FUMARIC ACID

John C. Munday, Cranford, and Dilworth T. Rogers, Summit, N. J., assignors to Standard Oil Development Company, a corporation of Delaware No Drawing. Application December 29, 1945, Serial No. 638,435

16 Claims. (Cl. 252—56)

This invention relates to novel chemical products and to processes of preparing and using same. More particularly it relates to high molecular weight copolymers of fumaric acid esters of two or more different saturated alcohols, and to the use of these copolymers for improving the pour point, viscosity index, and other properties of oils, particularly mineral lubricating oils, in which they are incorporated.

It has heretofore been suggested to make pour depressors for waxy lubricating oils by Friedel-Crafts condensation of an aliphatic material such as chlorinated paraffin wax with an aromatic material such as naphthalene or phenol, but the resulting products, although very satisfactory for most purposes, are not as good in certain respects as might be desired. It has also been suggested to make lubricating oil additives by polymerization of an unsaturated ester such as the vinyl ester of stearic acid, or by polymerization of acrylic acid esters such as octadecyl acrylate, or condensation polymers of an unsaturated alcohol and an unsaturated acid. Some of such products have shown good viscosity index improving properties but not good pour depressing properties, and some vice versa, and some, especially the latter one, have shown a tendency toward gel formation and toward becoming insoluble in highly paraffinic lubricating oil base stocks.

Broadly, the present invention comprises the production of copolymers of fumaric acid esters containing two or more different saturated alcohol groups, at least one of such groups containing more than 10 carbon atoms, and there being an average of about 5 to 15 carbon atoms in the monomeric esters.

Fumaric acid is an unsaturated dibasic acid having the formula HOOC—CH=CH—COOH, the two carboxyl groups having the transposition as shown below.

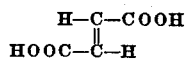

Esterification of fumaric acid with a single alcohol R—OH, gives an ester having the formula ROOC—CH=CH—COOR.

There are four different methods of carrying out the present invention, in respect to the preparation of the copolymers:

A. By copolymerizing a mixture of two or more dialkyl fumarate esters each one of which contains two like alcohol groups, but the alcohol groups in different esters being different; such a copolymer may be represented by the general formula:

B. By polymerizing a single mixed ester, i. e. one containing 2 different alcohol groups; such a copolymer may be represented by the formula (ROOC—CH=CH—COOR')$_n$.

C. By making a mixture of "A" and "B," such as would result from starting with a mixture of various alcohols and esterifying them with fumaric acid, and then polymerizing the resulting mixture of esters.

D. By making a mixture of various polymerized and copolymerized esters.

The saturated aliphatic alcohols, otherwise known as alkanols, to be used in preparing the fumaric acid ester for use according to this invention, may have 1 to 30 or more carbon atoms, preferably less than 20 carbon atoms. Primary alcohols are preferred, although in some cases secondary alcohols for example 5-ethyl nonyl-2 may be used. Straight chained alcohols are generally preferred, but slightly branched alcohols for example 2-ethyl hexyl, may be employed if desired.

As mentioned above, at least one of the alcohol groups should contain more than 10 carbon atoms; examples of such alcohol groups which may be used include:

| Name | No. of C's |
|---|---|
| Lauryl | 12 |
| Tetradecyl | 14 |
| Cetyl | 16 |
| Octadecyl (stearyl) | 18 |

Alcohols having an odd number of carbon atoms may also be used, although alcohols having even numbers are more readily available from materials found in nature such as the various vegetable, animal or fish fatty oils or waxes. Alcohols having either even or odd number of carbon atoms may be prepared by hydrogenation of carbon monoxide, or of fatty acids having the desired number of carbon atoms, such as lauric acid, or esters thereof. Mixed alcohols prepared commercially from natural products, may be used. One such preferred material made by hydrogenation of cocoanut oil is sold under the trade name "Lorol" and is a mixture of alcohols ranging from 10 to 18 carbon atoms, predominating in lauryl alcohol having 12 carbon atoms. Another related but slightly different mixture is called "Lorol B"; it contains more $C_{18}$. The composition of these two mixed commercial alcohols is approximately as follows:

COMPOSITION OF MIXTURES OF COMMERCIAL ALCOHOLS

| Component | (Trade Name) Lorol | Lorol B |
|---|---|---|
| | Weight per cent | Weight per cent |
| $C_{10}$ Alcohol | 4.0 | 3.0 |
| $C_{12}$ Alcohol | 55.5 | 46.0 |
| $C_{14}$ Alcohol | 22.5 | 24.0 |
| $C_{16}$ Alcohol | 14.0 | 10.0 |
| $C_{18}$ Alcohol | 4.0 | 17.0 |
| Average Number of Carbon Atoms | 12.8 | 13.5 |

It is thus apparent from the above table that Lorol is a mixture of commercial alcohols having an average number of 12.8 carbon atoms and Lorol B has an average of 13.5 carbon atoms.

As will be apparent from the preceding discussion, as well as from some of the subsequent discussion and data, it is possible to carry out the invention using only alcohols having more than 10 carbon atoms, although generally, it is preferred, and sometimes it is necessary, to use some alcohols having 10 or less carbon atoms. In such a case, any of the commonly available lower alcohols may be used such as the methyl, ethyl, propyl, butyl, amyl, hexyl, octyl, decyl, etc., or commercially available mixed alcohols such as octyl-decyl.

The proportion of alcohol groups having different numbers of carbon atoms in these fumaric ester raw materials to be polymerized according to this invention, should generally be adjusted to average about 5 to 15 carbon atoms, preferably about 7 to 14 carbon atoms, although it will be understood that the precise combination which gives best results may have to be adjusted slightly according to the type of oil base stock in which the polymerized product is intended to be incorporated, and according to the pour depressing potency desired. In this connection is should be noted that there are several different ways of judging pour depressing phenomena. One of these is by making the standard ASTM (American Society of Testing Materials) pour point test, wherein the oil blend is cooled continuously until it solidifies. Another method is to simulate winter field storage conditions by alternately subjecting the blend of oil containing a small amount of the pour depressor to cold and warm cycles and thereby determine the "pour stability" of the blend. This latter characteristic is of special value in supplementing ASTM pour point data, because blends of some pour depressors in certain oil base stocks sometimes solidify under winter field conditions at temperatures as much as 50° F. higher than the ASTM pour points. It is especially noteworthy that blends containing fumarate pour depressants exhibit excellent pour stability, frequently having stable pour points as low as, and sometimes lower than the ASTM pour points.

The monomers of the fumarates are easily prepared, for example by direct esterification of fumaric acid, or by ester interchange, these being well known reactions. Polymerization is generally carried out with peroxide catalysts, for example with benzoyl peroxide, acetyl peroxide, t-butyl hydroperoxide, t-butyl perbenzoate, etc. Temperatures in the range 50–120° C. are suitable when employing 0.1 to 5.0% by weight of catalyst, and the time may be from 8 to 72 hours. Oxygen should be excluded during polymerization through the use of an inert gas such as nitrogen or carbon dioxide. If desired, an inert solvent may be employed as a diluent to control polymer molecular weight.

The effect of molecular weight on the blending properties of fumarate mixed polymers and copolymers is relatively great in the case of viscosity index, and relatively little in the case of pour point. The higher the molecular weight, the greater will be the viscosity index obtained from a given quantity of polymer, and for this reason molecular weights up to 40,000 may be employed where an increase in viscosity index is desirable. For pour depressants, however, molecular weights may be at least as low as 1,000 and perhaps lower. Molecular weight may be determined by viscosity measurements on diisobutylene solutions containing 5 mg. polymer per cc., and the Staudinger equation. The degree of polymerization may be judged approximately from the increase in viscosity of the copolymer, i. e., free of any solvent; this viscosity of the Lorol fumarate polymer, for instance, should be about 60 to 3,000 seconds Saybolt at 210° F. The fumarate monomers are not pour depressants and also have substantially no viscosity index improving property. The invention is illustrated by the following examples.

EXAMPLE I

The fumaric ester of a commercial mixture of alcohols mostly in the $C_{12}$–$C_{18}$ range prepared by hydrogenation of cocoanut oil (called Lorol) was polymerized at 80° C. for 16 hours with 1.0 weight % benzoyl peroxide catalyst. The polymer was separated from unreacted monomer by dissolving in benzene and adding methanol, which precipitated the polymer which had a molecular weight of about 2,000. The yield after drying was about 90%. Blends containing 0.2 weight % of the polymer were made in three S. A. E. 10 grade test oils A, B and C which are highly, lightly and moderately dewaxed lubricating oil base stocks, respectively, derived from Mid-Continent (paraffinic) crude oil, and the ASTM pour points shown in Table I were determined.

Table I

| Polymer | ASTM Pour Point, ° F. | | |
|---|---|---|---|
| | Oil A | Oil B | Oil C |
| None | +5 | +30 | +20 |
| Polymerized Lorol Fumarate | −10 | −15 | −15 |

Di-n-decyl fumarate was polymerized at 80° C. for 16 hours with 0.5 weight % benzoyl peroxide catalyst. The total product was a heavy oil, which was dissolved in benzene and methanol was then added to precipitate the polymer. Blends containing 0.2 weight % of the polymer were made in the same three test oils, and ASTM pour points determined. Data are given in Table II.

Table II

| Polymer | ASTM Pour Point, °F. | | |
|---|---|---|---|
| | Oil A | Oil B | Oil C |
| None | +5 | +30 | +20 |
| Di-n-decyl Fumarate | 0 | +30 | +15 |

The data in Table II show that little if any pour depression was obtained by the addition of 0.2 weight % of di-n-decyl fumarate polymer to the test oils. Similar results were obtained with polymers of fumaric esters of other single alcohols.

A comparison of these results with those of Table I shows the necessity of employing a mixture of fumaric esters for the polymerization if good pour depression is to be obtained. The Lorol fumarate polymer was actually a copolymer of esters containing alcohol groups of different chain lengths, analysis of the Lorol indicating a composition approximately 5% $C_{10}$, 55% $C_{12}$, 20% $C_{14}$, 15% $C_{16}$ and 5% $C_{18}$ primary, straight chain alcohols.

EXAMPLE II

To the monomeric mixed fumaric esters of Lorol employed in Example I was added di-n-decyl fumarate monomer in various proportions, and copolymers were prepared therefrom as in Example I. The pour inhibiting action of the various copolymers was determined in 0.1 and 0.2 weight % concentrations in the test oils as shown in Table III.

Table III

| Copolymer Composition | | ASTM Pour Point, °F. | | | | | |
|---|---|---|---|---|---|---|---|
| Percent Lorol Fumarate | Percent Decyl Fumarate | Oil A | | Oil B | | Oil C | |
| | | 0.1% | 0.2% | 0.1% | 0.2% | 0.1% | 0.2% |
| 100 | 0 | ---- | −10 | ---- | −15 | ---- | −15 |
| 80 | 20 | −15 | −10 | −15 | −30 | −20 | −20 |
| 70 | 30 | −20 | −25 | −10 | −25 | −20 | −25 |
| 50 | 50 | −20 | −25 | +30 | +15 | −30 | −30 |
| 0 | 100 | +5 | 0 | +30 | +30 | +20 | +15 |
| None | ---- | +5 | | +30 | | +20 | |

The addition of 20% of decyl fumarate to the Lorol ($C_{12}$–$C_{18}$) fumarate resulted in substantial improvement in pour depression by the resulting copolymer in oil B, and a slight improvement in oil C. Copolymer containing equal amounts of decyl and Lorol fumarates proved very effective in oils A and C, but was ineffective in oil B. The 70–30 copolymer was very effective in each of the oils, giving −25° F. pour points in 0.2% concentration. When the data set forth in Table III are plotted on a chart, it is apparent that the preferred proportion of decyl fumarate is about 10 to 40% while the corresponding proportion of Lorol fumarate is about 90 to 60%, in making a copolymer which is an effective pour inhibitor in all three oil base stocks, A, B and C, although for oils A and C the proportion of decyl fumarate may be increased in substantially above 50% without losing substantial pour depressing properties.

EXAMPLE III

A mixed ester, methyl Lorol fumarate, was prepared by reacting dimethyl fumarate with sufficient Lorol to displace only one of the methyl groups. A portion of the product was distilled at 1 mm. pressure, removing as a bottoms fraction about 10% of waxy solid, probably di-Lorol fumarate. The overhead fraction, and also a portion of crude undistilled methyl Lorol fumarate monomer were polymerized overnight at 80° C. with 1.0% benzoyl peroxide catalyst. The polymers were precipitated in about 80% yield by mixing with four volumes of a 50–50 methanol-isopropanol mixture. Blends of the polymers in 0.2 weight % concentration with the test oils A, B and C gave the ASTM pour points shown in Table IV.

Table IV

| Polymer | ASTM Pour Point, °F. | | |
|---|---|---|---|
| | Oil A | Oil B | Oil C |
| None | +5 | +30 | +20 |
| Methyl Lorol Fumarate | | | |
| Distilled | −25 | +30 | −20 |
| Not distilled | −25 | −30 | −20 |

These data show that the polymer prepared from distilled methyl Lorol fumarate was an effective pour depressor for both oils A and C, although not for oil B. The undistilled methyl Lorol fumarate, however, gave a polymer having substantial pour depressing properties in all base stocks tested.

EXAMPLE IV

Di-n-octyl fumarate, di-n-cetyl fumarate and di-n-stearyl fumarate were polymerized singly and also as mixtures to give copolymers in which the average of the alcohol groups was $C_{11}$, $C_{11.5}$ and $C_{12}$. Polymerization conditions were 80° C., 1.0 weight % benzoyl peroxide catalyst, nitrogen atmosphere, and 16 hours reaction time, and the total products were tested for pour depressant activity. Table V shows the results which were obtained on blending 0.2 weight % of the polymers in the test oils.

Table V

| Polymer | ASTM Pour Point, °F. | | |
|---|---|---|---|
| | Oil A | Oil B | Oil C |
| None | +5 | +30 | +20 |
| Octyl Fumarate | +5 | +30 | +20 |
| Cetyl Fumarate | +0 | +30 | +10 |
| Stearyl Fumarate | +0 | +30 | +20 |
| Octyl-cetyl Fumarate ($C_{11.0}$) | −30 | −30 | −25 |
| Octyl-stearyl Fumarate ($C_{11.5}$) | −15 | −20 | −20 |
| Octyl-stearyl Fumarate ($C_{12.0}$) | −10 | −15 | −20 |

EXAMPLE V

Copolymers were prepared as in Example IV from Lorol B fumarate, and from a mixture containing equal weights of Lorol B fumarate and decyl fumarate. The two copolymers were tested for pour depressant activity, singly and as a mechanical mixture containing equal weights of the two copolymers. The results, shown in Table VI, illustrate the synergistic effect which is obtained on employing mixtures of two or more copolymers which exhibit good pour depressant activity in different types of base oils.

*Table VI*

| Polymer | ASTM Pour Point, °F. | | | | | |
|---|---|---|---|---|---|---|
| | Oil A | | Oil B | | Oil C | |
| | 0.1% | 0.2% | 0.1% | 0.2% | 0.1% | 0.2% |
| Lorol B Fumarate | −10 | −15 | −15 | −15 | −15 | −15 |
| Decyl Fumarate-Lorol B Fumarate Copolymer | −20 | −25 | +30 | +15 | −30 | −30 |
| 50-50 Mechanical Mixture | | −30 | | −25 | | −30 |

The synergistic effect has been observed also on employing mixtures of fumarate copolymers with pour depressants of entirely different types, for example, with aluminum chloride catalyzed condensation products of naphthalene or phenol and chlorinated wax. In some cases, synergism is observed in ASTM pour points, while in other cases the effect is noted partly or entirely in pour stability under winter field storage conditions.

In considering the preceding description and data, it will be understood that polymerization of the various fumarate esters occurs through a linking up of the carbon atoms which in the monomer carry the double bond, and that the ester groups are present as side chains to the linear polymer chain. The length of the alcohol groups in the side chains has a great effect on pour depressing potency of the polymeric fumarate in different types of oils. Thus, a fumarate copolymer may be an exceptional pour depressant in one oil, and without action in another oil, depending upon the alcohol groups in the copolymer. Where pour depressancy in a wide variety of oils is desired, more than two different alcohol groups may be employed to advantage.

Although the invention has been above described as especially applicable to the incorporation of fumaric ester copolymers in waxy mineral lubricating oils, it is intended that the invention be applied broadly to the use of such copolymers as viscosity index improvers, or for other purposes, in paraffinic, naphthenic or mixed base lubricating oils, as well as for improving the properties of mineral oils of lower viscosity range such as gas oils, kerosene or even heavy naphthas, or for improving other types of oil base stocks such as fatty oils and synthetic oils and greases and the like.

It is not intended that this invention be limited to the specific materials which have been recited merely for the sake of illustration but only by the appended claims in which it is intended to claim all novelty inherent in the invention as well as all modifications coming within the scope and spirit of the invention.

What is claimed is:

1. A composition comprising a major proportion of a waxy mineral lubricating oil and a minor but at least pour point depressing amount of a polymer of fumarate alkyl ester composition having more than one distinct alkyl ester group having from 1 to 18 carbon atoms, at least one of said alkyl ester groups having a chain length in excess of 10 carbon atoms and all of said alkyl ester groups having an average of between 5 and 15 carbon atoms, said polymer having a molecular weight within a range of from 1,000 to 40,000 and having been prepared by first forming the fumarate ester and then polymerizing said ester in the absence of air.

2. A polymer of fumarate alkyl ester composition having more than one distinct alkyl ester group having from 1 to 18 carbon atoms, at least one of said alkyl ester groups having a chain length in excess of 10 carbon atoms and all of said alkyl ester groups having an average of between 5 and 15 carbon atoms, said polymer having a molecular weight within a range of from 1,000 to 40,000 and having been prepared by first forming the fumarate ester and then polymerizing in the absence of air.

3. Composition comprising a major proportion of a non-volatile mineral oil base stock and a minor but pour point depressing proportion of a copolymer of two different dialkyl fumarate esters of saturated alcohols having from 1 to 18 carbon atoms in which the two alkyl groups of each ester are alike, at least one of which has more than 10 carbon atoms and there being an average of 5 to 15 carbon atoms in the said alkyl groups, said copolymer having an average molecular weight ranging between 1,000 to 40,000 and having been prepared by first forming the fumarate esters and then polymerizing said esters in the absence of air.

4. Product consisting essentially of a copolymer of two different dialkyl fumarate esters of saturated alcohols having from 1 to 18 carbon atoms in which two alkyl groups of each ester are alike, at least one of which is more than 10 carbon atoms and there being an average of 5 to 15 carbon atoms in the said alkyl groups, said copolymer having been prepared by first forming the fumarate esters and then polymerizing in the absence of air.

5. A composition comprising a major proportion of a substantially non-volatile mineral oil and a minor but pour point depressing proportion of a polymerization product of a monomeric fumaric acid saturated alcohol ester material containing two different saturated alcohol groups of from 1 to 18 carbon atoms, at least one of such groups having more than 10 carbon atoms, and said alcohol groups having an average of 5 to 15 carbon atoms, said polymerization product having an average molecular weight ranging between 1,000 and 40,000, and having been prepared by first forming the fumarate ester and then polymerizing in the absence of air.

6. Composition according to claim 1 in which the alkyl groups are all derived from primary alcohols.

7. Composition according to claim 1 in which the alkyl fumarate is substantially free from highly branched alkyl groups.

8. Composition according to claim 1 in which the alkyl groups are all substantially straight chained.

9. Composition according to claim 1 containing a polymerization product of a fumaric acid esterification product of a mixture of saturated alcohols having 10 to 18 carbon atoms and having an average of 12 to 14 carbon atoms.

10. Composition according to claim 1 in which the alkyl groups of the fumarate ester correspond substantially to mixed alcohols derived by hydrogenation of cocoanut oil.

11. Composition according to claim 1 containing a polymerization product of a fumaric acid esterification product of a mixture of saturated alcohols containing a major proportion of lauryl alcohol and containing minor proportions of alcohols having both higher and lower numbers of carbon atoms than 12, but said total mixed alcohols having an average of 10 to 14 carbon atoms.

12. Composition according to claim 1 containing a copolymer of at least two different dialkyl fumarate esters, in which the two alkyl groups of each ester are alike, and in which all of the alkyl groups in all of the esters are derived from substantially straight chain primary saturated alcohols, said copolymer having an average molecular weight of 1,000 to 40,000.

13. Composition according to claim 1 containing a copolymer of 10 to 40% by weight of decyl fumarate and 90 to 60% by weight of "Lorol" fumarate.

14. Product according to claim 2 being a polymerization product of a fumaric acid esterification product of a mixture of saturated alcohols having 10 to 18 carbon atoms and having an average of 12 to 14 carbon atoms.

15. Product according to claim 2 in which the alkyl groups of the fumarate ester correspond substantially to mixed alcohols derived by hydrogenation of cocoanut oil.

16. Product consisting of a copolymer of two different dialkyl fumarate esters, in which the two alkyl groups of each ester are alike, and in which all of the alkyl groups in all of the esters are derived from substantially straight chain primary saturated alcohols having from 1–18 carbon atoms, at least one of said alkyl groups having more than 10 carbon atoms and the average of all the alkyl groups being between 5 and 15 carbon atoms, said copolymer having an average molecular weight of about 1,000 to 40,000 and having a viscosity of about 60 to 3,000 seconds Saybolt at 210° F., said copolymer having been prepared by first forming the fumarate esters and then polymerizing in the absence of air.

JOHN C. MUNDAY.
DILWORTH T. ROGERS.

REFERENCES CITED

The following references are of record in the file of this patent:

UNITED STATES PATENTS

| Number | Name | Date |
|---|---|---|
| 1,945,307 | Dykstra | Jan. 30, 1934 |
| 2,084,501 | Otto | June 22, 1937 |
| 2,195,362 | Ellis | Mar. 26, 1940 |
| 2,227,690 | Arveson | Jan. 7, 1941 |
| 2,252,393 | Bradley et al. | Aug. 12, 1941 |
| 2,327,705 | Frolich | Aug. 24, 1943 |
| 2,366,517 | Gleason | Jan. 2, 1945 |
| 2,375,516 | Blair, Jr. | May 8, 1945 |
| 2,380,304 | Gleason | July 10, 1945 |
| 2,386,446 | De Groote | Oct. 9, 1945 |
| 2,431,374 | D'Alelio | Nov. 25, 1947 |
| 2,437,962 | Kropa | Mar. 16, 1948 |
| 2,460,035 | Rogers et al. | Jan. 25, 1949 |